W. H. POWELL & R. B. WILLIAMSON.
DYNAMO ELECTRIC MACHINE.
APPLICATION FILED APR. 8, 1910.

1,028,963.

Patented June 11, 1912.

Witnesses
Rob. E. Hall.
Chas. L. Byron

Inventors
William H. Powell
Robert B. Williamson
By Chas. E. Lord
Attorney

UNITED STATES PATENT OFFICE.

WILLIAM H. POWELL AND ROBERT B. WILLIAMSON, OF MILWAUKEE, WISCONSIN, ASSIGNORS TO ALLIS-CHALMERS COMPANY, A CORPORATION OF NEW JERSEY.

DYNAMO-ELECTRIC MACHINE.

1,028,963.  Specification of Letters Patent.  Patented June 11, 1912.

Application filed April 8, 1910. Serial No. 554,182.

*To all whom it may concern:*

Be it known that we, WILLIAM H. POWELL and ROBERT B. WILLIAMSON, citizens of the United States, and residents of Milwaukee, in the county of Milwaukee and State of Wisconsin, have invented certain new and useful Improvements in Dynamo-Electric Machines, of which the following is a full, clear, and exact specification.

This invention relates to dynamo electric machines, and particularly to large machines, such as turbo-generators, which are inclosed in housings and are cooled by air which is forced by blowers into the housing and is then conducted through different passageways of the machine.

In certain machines, and particularly in large and compactly built turbo-generators of exceptionally large current output, difficulty has been encountered in maintaining all parts of the machine at a sufficiently low temperature. This is due chiefly to the fact that it is a difficult matter to force the requisite amount of air through the machine and also to some extent to the fact that the friction resistance to the air in passing through the machine is unnecessarily high.

The object of the present invention is to obtain a more effective cooling of a dynamo electric machine by providing features of construction which increases the efficiency of the blowers and reduces the friction of the air in passing through the machine.

More particularly, the invention relates to arrangements for guiding the air to the blowers and for facilitating the flow of air to air receiving chambers within the housing, and to means for diffusing or spreading the air as it is discharged by the blowers into the air receiving chambers, so as to more effectively change the kinetic or velocity head of the air at the blowers to a static or pressure head in the housing or in the air receiving chambers.

Our invention is of particular utility in machines of the type wherein the air is conducted through suitable air conduits provided in the ends of the housing and extending from the lower portion or bottom of the housing upwardly to or about the shaft where they are provided with annular openings which surround the shaft and communicate with suitable air receiving chambers at the ends of the stator core, the air being drawn into the housing and forced through the machine by fans or blowers arranged on the ends of the rotor.

Figure 1:
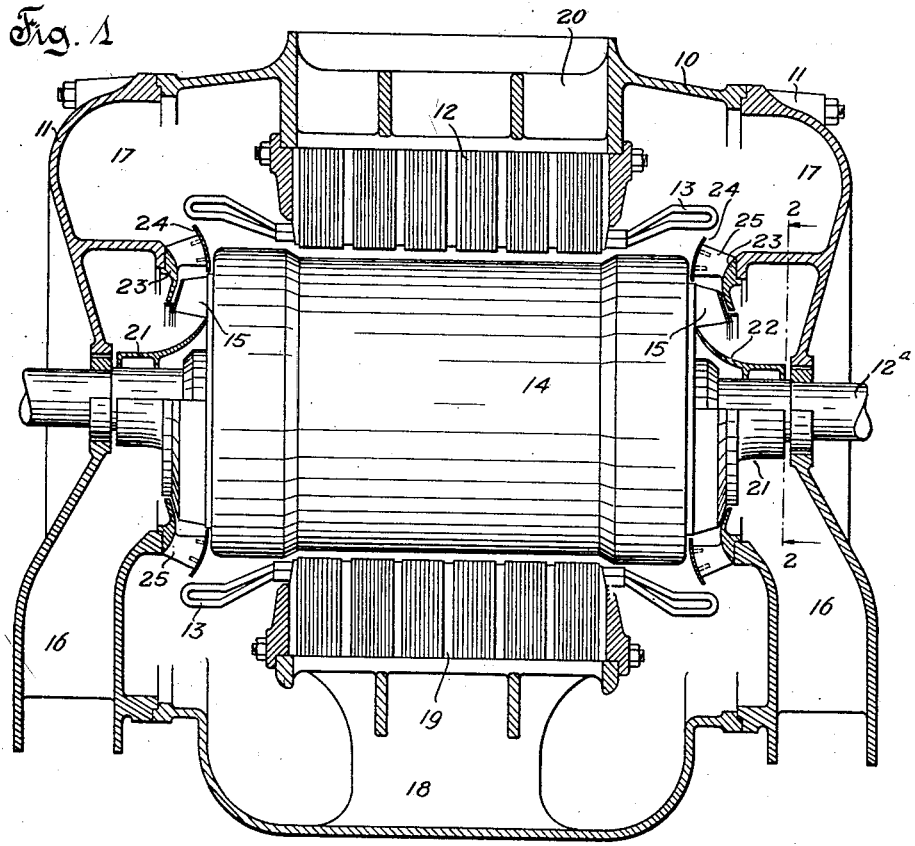
Figure 2:
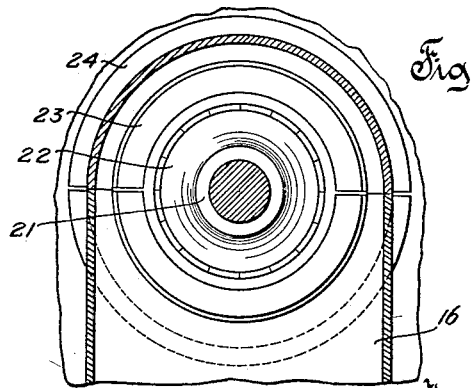

In the accompanying sheet of drawings, we have shown our invention applied to a machine of the above type, and in the drawings Figure 1 is a vertical longitudinal sectional view of a turbo-alternator constructed in accordance with our invention, the rotor proper and certain portions which move with the rotor being shown in elevation, while other portions are shown in section; and Fig. 2 is a partial transverse sectional view along the line 2—2 of Fig. 1, looking in the direction indicated by the arrows.

The housing of the dynamo-electric machine illustrated in the drawings includes a main or central portion 10 and end portions 11 secured to the central portion. Supported by the portion 10 of the housing is a laminated stator core 12 having the usual stator winding 13. The ends 11 of the housing have suitable openings through which extends a shaft 12$^a$ on which is mounted a rotor 14 provided at its ends with blowers 15. In the ends 11 of the housing are air conduits 16 which extend upwardly about the shaft, and the inner walls of these conduits are provided adjacent the blowers 15 with annular openings which surround or are arranged concentrically with respect to the shaft and communicate with substantially annular air receiving chambers 17 at the ends of the stator core so that the air can be drawn by the blowers upwardly through the conduits 16 and forced into the chambers 17. At the lower part of the housing, is another air receiving chamber 18 to which the air passes from both chambers 17, and this chamber 18 communicates with the circumferential air passageways 19 in the stator core. At the top of the housing is a chimney or exhaust opening 20 for the air after it has been forced through the passageways 19. The parts so far described are of the usual or well known construction.

It will be seen that the conduits 16 are substantially parallel to the chambers 17 and that the course of the air in passing from the conduits 16 to the chambers 17 is changed abruptly, and in fact, at substantially right angles to its course in passing upwardly through the conduits. Consequently, unless means is provided for guiding the air and for gradually changing its course, considerable velocity head will be lost at the abrupt turn. To increase the efficiency of the blowers, and particularly to guide and facilitate the flow of air to the blowers so as to avoid any material loss in velocity head in passing from the conduits to the chamber 17, we employ air guiding means or deflectors 21 which are secured or mounted on the shaft in the upper portions of the air conduits 16 and have flaring portions 22 which extend through the communicating openings between the conduits and air receiving chambers 17, these portions curving outwardly from the shaft 12ª, and extending substantially to the ends of the rotor core just below or within the blowers. With these guiding plates, the air may pass from the conduits to the blowers with little friction and with little loss in velocity or velocity head.

To further increase the efficiency of the blowers and particularly to avoid eddying of the air and to secure a gradual change from the kinetic or velocity head to a static head in the chambers 17, we employ air spreaders or diffusers, each of which includes a curved stuffing ring 23 which is secured to the inner wall of the housing about the opening between one of the conduits and the adjacent air receiving chamber 17. These stuffing rings have portions extending inwardly along the sides of the blowers and also outwardly curved outer portions which are located beyond or outside of the blowers. Each spreader or diffuser also includes in addition to the curved stuffing ring a curved plate 24 which in this case is secured to arms 25 on the inner face of the stuffing ring, the stuffing ring and the plate 24 forming a substantially outwardly flaring annular passageway through which the air passes and which is so shaped as to spread and diffuse the air into the chambers 17 and to prevent its being conducted forcibly against the stator winding 13 or be thrown outwardly in a line against the housing.

With the improvements above described, considerably more air can be forced through the machine than heretofore; the efficiency of the blowers is considerably increased; the friction of the air in passing through the machine is decreased; and a more effective cooling of the machine is secured.

We do not desire to be confined to the exact details shown, but aim in our claims to cover all modifications which do not involve a departure from the spirit and scope of our invention.

Having thus described our invention what we claim is:

1. In a dynamo-electric machine, the combination of a stator having a housing, a rotor having a shaft and located within the housing, said housing being adapted to receive air around said shaft, means within said housing for circulating the air, and a deflector mounted directly on said shaft and provided with a flaring portion the dimensions of which increase toward the inner part of the machine, said deflector being adapted to guide the incoming air to said circulating means.

2. In a dynamo-electric machine, a rotor having a shaft and core, a blower at the end of the rotor, a stator, a housing inclosing the same, said housing extending beyond the end of the stator and forming an air chamber and provided with an annular opening which surrounds the shaft adjacent the blower and communicates with said chamber, and a deflector mounted on the shaft and provided with a flaring portion which extends through said opening, whereby air may be guided to said blowers and into the chamber.

3. In a dynamo-electric machine, a rotor having a shaft and core, a stator, a housing inclosing the same, said housing having at an end thereof a conduit extending toward the shaft and provided with an opening surrounding the same, and also a chamber between the rotor core and said end of the housing and adapted to receive air supplied through said conduit, and a deflector surrounding the shaft and having a portion extending inwardly toward the chamber and flaring outwardly from the shaft.

4. In a dynamo-electric machine, a rotor having a shaft and core, a blower at the end thereof, a stator, a housing inclosing the rotor and stator and forming at the end of the stator core an air chamber, an air supplying conduit at the end of the housing, said conduit extending upwardly about the shaft and provided with an annular opening which surrounds the shaft adjacent the blower and communicates with said chamber, and a curved deflector plate mounted on the shaft at the upper end of the conduit and provided with a portion which extends through the opening and is curved or flares away from the shaft.

5. In a dynamo-electric machine, a rotor having a shaft and core, a stator, blowers at the ends of the core, a housing inclosing the rotor and stator and forming at opposite ends of the stator core air receiving chambers, air supplying conduits at the ends of the housing, said conduits extending from the bottom of the housing upwardly to and about the shaft and being provided with discharge openings which surround the shaft adjacent the blowers, and deflector or guide plates mounted on the shaft at the upper ends of the conduits and having curved or outwardly flaring portions which extend through the openings.

6. In a dynamo-electric machine, a stator, a rotor having a shaft, a housing inclosing the stator and rotor and forming an air receiving chamber at the end of the stator, said housing having an air inlet opening surrounding the shaft, means for supplying air through said opening, and means within and secured to the housing adapted to diffuse or spread the air into the chamber.

7. In a dynamo-electric machine, a stator, a rotor having a shaft, a blower at the end of the rotor, a housing inclosing the stator and rotor and forming an air receiving chamber at the end of the stator, a conduit for conveying air to the chamber, said conduit and chamber having a communicating opening surrounding the shaft adjacent the blower, and a curved spreader arranged about the blower so as to guide the air discharged therefrom and diffuse the same in the chamber, and thereby gradually convert the kinetic head in the blower to static or pressure head in the chamber.

8. In a dynamo-electric machine, a stator, a rotor having a shaft, a blower at the end of the rotor, a housing inclosing the stator and rotor and forming an air receiving chamber at the end of the stator, said housing having an air inlet opening surrounding the shaft adjacent the blower, and means for spreading or diffusing the air in the chamber comprising an annular curved plate which is supported by the housing adjacent to and surrounding the blower.

9. In a dynamo-electric machine, a rotor having a shaft and core, a blower supported by the core, a stator, a housing inclosing the stator and rotor and forming an air receiving chamber at the end of the stator, said housing having an air receiving opening about the shaft, and means for spreading or diffusing the air forced by the blower into the chamber comprising a curved stuffing ring arranged in the opening adjacent the blower and a curved plate which is supported by the stuffing ring, the air passing between the plate and the stuffing ring.

10. In a dynamo-electric machine, a shaft, a rotary core and a fan or blower supported by the shaft, a stator, a housing inclosing said stator and rotary parts and forming at the ends of the stator air receiving chambers, conduits at the ends of the housing and extending upwardly to and about the shaft, said conduits having annular openings about the shaft adjacent the blowers, and a pair of curved air spreading members which extend about or surround each of the blowers, so as to spread or diffuse the air discharged by the blowers into the chambers.

11. In a dynamo-electric machine, the combination of a stator having a housing, a rotor comprising a core and shaft and located within said housing, said housing being adapted to receive air around said shaft, means within the housing for circulating the air, and a deflector abutting said core and mounted directly on said shaft and adapted to guide the in-coming air to said circulating means, said deflector having a flaring portion the flare of which increases toward said core.

Milwaukee, Wis., March 25, 1910.

In testimony whereof we affix our signatures, in the presence of two witnesses.

WILLIAM H. POWELL.
ROBERT B. WILLIAMSON.

Witnesses:
   CHAS. L. BYRON,
   ROB. E. STOLL.

---

Copies of this patent may be obtained for five cents each, by addressing the "Commissioner of Patents, Washington, D. C."